Patented June 26, 1951

2,558,396

UNITED STATES PATENT OFFICE 2,558,396

METHOD OF PREPARING FINELY DIVIDED PLASTICIZED POLYMERIZED MATERIALS AND PRODUCTS THEREOF

Walter M. Thomas, Stamford, Conn., assignor to American Cyanamid Company, New York, N. Y., a corporation of Maine No Drawing. Application October 16, 1947, Serial No. 780,309

6 Claims. (Cl. 260—29.6)

This invention relates broadly to a method of preparing finely divided, plasticized polymerized materials and to the products thereof. More particularly the invention is concerned with the preparation of a finely divided (specifically in the form of granules or spherical beads), plasticized product of polymerization of a polymerizable mass comprising acrylonitrile. Specifically the invention is directed to a new and improved method of producing beads of a copolymer of ethyl acrylate and acrylonitrile plasticized with o-cresyl glyceryl ether, which method comprises: forming a dispersion of a small amount of an inorganic colloidal dispersing agent in water; dissolving o-cresyl glyceryl ether and benzoyl peroxide in a mixture of acrylonitrile and ethyl acrylate in a weight ratio of from about 35 to about 65 parts of acrylonitrile to from about 65 to about 35 parts of ethyl acrylate, the o-cresyl glyceryl ether being employed in an amount corresponding to, by weight, from about 5 to about 100 parts thereof for each 100 parts of the said mixture of acrylonitrile and ethyl acrylate and the benzoyl peroxide being employed in an amount corresponding to from about 0.05% to about 4% by weight of the said mixture of acrylonitrile and ethyl acrylate; adding the resulting solution to the said dispersion of inorganic colloidal dispersing agent in water while agitating the latter; heating the resulting mixture under reflux while gently stirring the mass until refluxing stops and for a short period thereafter whereby an acrylonitrile-ethyl acrylate copolymer plasticized with o-cresyl glyceryl ether is obtained in the form of beads; separating the said beads from the aqueous dispersion medium in which they were formed; and washing and drying the separated beads.

In practicing my invention there is dispersed in a liquid dispersion medium comprising water a solution containing (1) a liquid monomeric material including acrylonitrile, (2) a polymerization catalyst such as, for instance, an organic peroxide (e. g., benzoyl peroxide, etc.) and (3) a plasticizer for the polymerization product (e. g., o-cresyl glyceryl ether, etc.). For optimum results the chosen catalyst and plasticizer should be soluble in the monomeric material to a substantial degree but should be insoluble or substantially insoluble in water, as otherwise the losses of catalyst and plasticizer are considerable and the cost of the process is correspondingly increased. The monomeric material is then polymerized to solid state, preferably to a molecular weight ranging between 15,000 and 300,000 as calculated from viscosity measurements using the Staudinger equation (reference: U. S. Patent No. 2,404,713), while maintaining the solution of monomeric material, catalyst and plasticizer in the form of globules in the dispersion medium. The finely divided, plasticized polymerization product thereby obtained is then isolated from the aqueous dispersion medium by suitable means, e. g., by filtration, centrifuging, etc.

It was known prior to my invention to polymerize various polymerizable organic compounds, singly or admixed, in bulk, in solution state or in the form of an emulsion. If the polymerization product requried plasticization, the usual procedure has been to incorporate the plasticizer in the polymer or copolymer, for example, by working the mixture on hot rolls. If a finely divided, plasticized product then was desired for molding or other purposes, the resulting sheet material had to be crushed and screened to size. Such processes are costly and time-consuming, and frequently yield materials in which the plasticizer is not homogeneously distributed throughout the polymerization product. The problem of obtaining finely divided, homogeneously plasticized polymers and copolymers of acrylonitrile at a relatively low cost and in a minimum of time has been a considerable one due, for one reason, to the fact that many of these polymerization products, especially the higher-molecular-weight polyacrylonitriles and copolymers thereof produced from a monomeric mixture containing a major proportion (more than 50%) by weight of acrylonitrile are not readily plasticized.

The present invention is based on my discovery that finely divided (more particularly in the form of grains or beads), plasticized polymers and copolymers of acrylonitrile can be prepared as briefly described in the first and second paragraphs of this specification and more fully hereafter. Since the milling and grinding steps are eliminated, the finely divided, plasticized material can be produced more rapidly and at lower cost than by conventional methods. Furthermore, substantially all of the plasticized grains or beads of polymeric or copolymeric acrylonitrile resulting from my method each contain both the polymerization product and the plasticizer, so that a more homogeneous, finely divided product is obtained than by the prior methods.

Other advantages accruing from my invention as compared with conventional emulsion polymerization of monomeric materials of the kind with which the present invention is concerned are the elimination of the usual step of emulsifying the monomeric material prior to polymerization and the elimination of the step of coagulating the polymerization product after its formation, which means a saving in materials cost since no coagulating agent is required and in operating costs since there is no coagulating agent to be removed. The plasticized polymerization products of my invention settle readily from the aqueous dispersion medium in which they are dispersed, upon discontinuing stirring of the medium, in the form of fine granules or spherical beads, in which state they can be readily washed and dried. This was quite surprising and unpredictable, since normally it would be expected that plasticized polymers and copolymers of acrylonitrile, when formed initially in finely divided state, would agglomerate and stick together due to the plasticizer therein or, as might be expected, on the outer surfaces of the individual particles.

Dried grains or beads of the plasticized polymerization products of my invention are free flowing. Furthermore, the flow of a given amount of beads of a particular average diameter or sieve size through a small orifice is more rapid than that of the same amount of a plasticized polymerization product which is prepared by incorporating the same percentage of plasticizer into the separately prepared polymerization product, e. g., by mixing and milling the plasticizer with the polymer or copolymer, and grinding and screening the resulting plasticized material to approximately the same average diameter or sieve size as the beads of polymerization product produced in accordance with my invention. This also was quite surprising and unexpected and in no way could have been predicted.

In carrying my invention into effect a suitable polymerization catalyst, for instance an organic peroxide which is soluble (or dispersible) in the material to be polymerized, e. g., monomeric acrylonitrile or a mixture of monomers including acrylonitrile, and a plasticizer for the polymerization product, which plasticizer also is soluble (or dispersible) in the material to be polymerized, are dissolved in the monomer or mixture of monomers. The resulting solution is then mixed with water containing a dispersing agent. Ordinarily the solution is mixed with at least twice, preferably free three to ten times, its volume of water containing a small amount, e. g., from 0.2 to 5% by weight thereof of a dispersing agent, more particularly a colloidal dispersing agent, e. g., bentonite. Preferably the aforementioned solution is added to the water containing the dispersion agent homogeneously distributed therein while agitating the latter. The resulting mixture is stirred at a moderate rate in a suitable reaction vessel, preferably one which is provided with a reflux condenser. The solution containing the monomer (or mixture of monomers), plasticizer and polymerization catalyst is dispersed in the form of small globules in the liquid dispersion medium comprising water, a suitable dispersing agent also generally being present in the water. The monomeric material is then polymerized, preferably under heat, while maintaining the solution in globular form in the dispersion medium, for example by moderate agitation of the mass during polymerization. When the desired degree of polymerization has been attained and the polymerization product is non-sticky, stirring is stopped, and the reaction mass preferably is cooled. Solid beads of polymerization product settle from the dispersion medium, and are immediately isolated, e. g., by decanting the supernatant liquid, and filtering and/or screening the residue. The separated beads are then washed, e. g., with water, and dried, e. g., at 50° to 100° C., the particular drying temperature being dependent upon the softening point of the product.

The dried, solid, plasticized polymerization products of my invention, for instance a copolymer of acrylonitrile and ethyl acrylate plasticized with o-cresyl glyceryl ether (mono-o-cresyl glyceryl ether), are in the form of granules or beads or bead-like particles. The size of these beads (or rounded particles) may be varied considerably by varying the conditions of polymerization including the rate of stirring and the amount of bentonite or other colloidal dispersion agent employed. Ordinarily, however, the average diameter of the beads resulting from a particular procedure will range between about ¼ and about 6 mm.

In addition to acrylonitrile alone, various mixtures of monomeric materials including acrylonitrile may be employed, more particularly monomers which are compatible with acrylonitrile and which form a thermoplastic copolymer therewith. In the preparation of thermoplastic copolymers of acrylonitrile, the proportions of copolymerizable ingredients may be varied as desired or as conditions may require. The acrylonitrile component may constitute as little as, for example, about 5% by weight of the mixture of copolymerizable ingredients or it may constitute a major proportion of the mixture of monomers, for instance 55 or 60% or even as high as, for example, 99.5% by weight of the said mixture. Good results have been obtained using a mixture of acrylonitrile and an alkyl acrylate, specifically ethyl acrylate, in the ratio of, by weight, from about 35 to 65% of the former to from about 65 to 35% of the latter. The beads of such copolymers plasticized in accordance with my invention, for example with a plasticizer comprising o-cresyl glyceryl ether the formula for which is

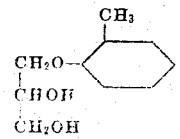

have been found to be particularly suitable for use as a modifier of heat-curable melamine-formaldehyde resins to yield a hot-moldable composition as more fully described in the copending application of Henry P. Wohnsiedler and Edward L. Kropa, Serial No. 780,296, filed concurrently herewith. Such copolymers preferably have a molecular weight calculated from viscosity measurements using the Staudinger equation ranging between 15,000 and 300,000, more particularly between 25,000 or 30,000 and 250,000. The molecular weight may be controlled, for example, by effecting the polymerization in the presence of a chain stopper, for instance a long-chain alkyl mercaptan, e. g., dodecyl mercaptan.

In selecting monomers for copolymerization with acrylonitrile I prefer to use those having a solubility in water at polymerization temperature of, by weight, less than about 8 parts per 100 parts of water. The major proportion of the monomeric material is then in the form of dispersed globules. I have found by analysis that, in the case of monomeric materials, which are soluble in water to some extent, the fraction of such material which originally is in true aqueous solution ultimately diffuses into the polymerizing globule and is incorporated therein. Similar results are obtained with acrylonitrile alone which has a solubility in water at 20°–30° C. of, by weight, about 8 parts thereof in 100 parts of water.

Various dispersion agents may be employed, the preferred ones being hydrophilic substances, more particularly colloids. Illustrative examples of dispersion agents which may be used are organic dispersing agents, for instance the various water-soluble or water-dispersible gums, e. g., gum arabic, gum acacia, gum tragacanth, gum ghatti, East India gum, Senegal gum, etc.; and such materials as soluble starches (e. g., methyl starch), agar agar, glue, gelatin, sodium alginate, the various albumens (e. g., blood albumen, egg albumen, vegetable albumens, etc.), water-soluble methyl cellulose and other water-soluble ethers of cellulose, polyvinyl alcohol, etc.; and inorganic dispersing agents, for instance bentonite, the various colloidal or colloid-forming clay minerals (e. g., montmorillonite, leverrierite, etc.), micro-pulverized magnesia, talc, kaolin, calcium phosphate, etc. The kind and amount of dispersing agent are chosen so that the solution of monomeric material, polymerization catalyst and plasticizer will be maintained in the dispersed phase while stirring the aqueous dispersion during polymerization. The amount of dispersing agent and the rate of stirring are so adjusted as to maintain the said solution in the form of globules in the dispersion medium during polymerization. In no case is the amount of dispersing agent used or the rate of stirring so rapid as to cause the solution to form a permanent dispersion of the product. Hence there is no coalescence of the dispersed particles during polymerization and no settling of the polymerization product from the dispersion medium as a coalesced, or gummy or horny, mass.

In addition to the kind and amount of dispersion agent employed, the rate of stirring, is as has been indicated before, of considerable importance in dispersing the solution of monomeric material, plasticizer and polymerization catalyst in the aqueous dispersion medium in the form of discrete globules and in maintaining the solution in such form during polymerization. Stirring too rapidly may cause the solution to become permanently or substantially permanently dispersed in the dispersion medium, necessitating other steps, for example the addition of an electrolyte, etc., for recovering the polymerization product, or too rapid stirring may cause the polymerization product to be produced in such finely divided state that it is difficult to separate from the dispersion medium in the form of individual particles; while stirring too slowly may result in the failure of the solution to become dispersed in the dispersion medium in the form of globules of the desired size.

A satisfactory stirring mechanism consists of an anchor stirrer comprising a blade of sheet metal, preferably stainless steel, cut in the form of a crescent and of such a radius as to conform closely to the rounded bottom of a reaction vessel. The blade advantageously is of such a size as to reach nearly to the surface of the liquid at the tips of the crescent and having a maximum width of about one-fifth the distance between the tips. The blade is attached at its center to a shaft driven at a suitable speed, e. g., at 150 to 300 R. P. M., depending, for example, upon such factors as the bead size desired, the size of the reaction vessel and charge, the viscosity of the charge, and the specific design of the apparatus.

Stirring with an anchor stirrer of the kind described above at 150 to 300 R. P. M. gives satisfactory results when using a round-bottomed reaction vessel having a capacity of 5 liters, which vessel is filled with 2½ liters of a mixture of (1) two liters of water containing about ½ to 1½% by weight of a dispersing agent, specifically bentonite, and (2) one-half liter of a solution of monomeric material (specifically a mixture of acrylonitrile and ethyl acrylate), plasticizer (specifically o-cresyl glyceryl ether) and polymerization catalyst (specifically benzoyl peroxide). Other monomeric material may be used instead of the monomeric material specifically mentioned above by way of illustration, e. g., acrylonitrile alone, or a mixture of acrylonitrile and one or more other alkyl acrylates (e. g., methyl acrylate, propyl acrylate, etc.), or a mixture of acrylonitrile, an alkyl acrylate (e. g., ethyl acrylate) and another acrylic compound (e. g., N-butyl acrylamide), for instance in equal proportions by weight in the case of the mixtures of monomers. Other plasticizers and polymerization catalysts, numerous examples of which hereafter are given, may be used in place of those specifically mentioned.

Any suitable polymerization catalyst may be employed, more particularly a polymerization catalyst which is soluble (or dispersible) in the monomeric material. Illustrative examples of such catalysts are the organic peroxides, for instance peroxides of the aromatic acid series, e. g., benzoyl peroxide, etc.; the acyl peroxides including the diacyl peroxides and the monoacylmonoalkyl peroxides; the dialkyl peroxides; and the alkyl hydroperoxides. More specific examples of peroxide polymerization catalysts which may be used are diacetyl peroxide, dilauryl peroxide, distearyl peroxide, dicaprylyl peroxide, acetyl benzoyl peroxide, acetyl stearyl peroxide, mono-tert.-butyl monoacetyl peroxide, mono-tert.-butyl monocaprylyl peroxide, tert.-butyl hydroperoxide, tert.-amyl hydroperoxide, tert.-butylperoxy isopropyl carbonate, ethylperoxy ethyl carbonate, 1-hydroxycyclohexyl hydroperoxide-1, tert.-butyl perbenzoate, di-tert.-butyl peroxide, dipropionyl peroxide, di-butyryl peroxide, dicyclohexyl peroxide, di-n-amyl peroxide, dimethyl peroxide, diethyl peroxide, di-isopropyl peroxide, methyl hydroperoxide, didodecyl peroxide, di-octadecyl peroxide, chloroacetic peroxide, dichloroacetic peroxide, etc. Other examples of peroxides which may be used are disclosed, for instance, in the patents of Milas, Nos. 2,176,407, 2,223,807 and 2,298,405, and in Strain Patent No. 2,374,789.

The catalysts preferably are those which are soluble in monomeric acrylonitrile or in the particular mixture of monomers employed, so that when the monomeric material is dispered in the aqueous dispersion medium the individual globules thereof will each contain both polymerization catalyst and a material which is a plasticizer for the polymerized material. If the catalyst is not initially soluble in the monomeric material, it may be dissolved in a solvent which latter, in turn, is soluble (or dispersible) in the monomer or mixture of monomers. For instance, with some catalysts and monomeric materials such solvents for the catalyst as, for instance, the lower alkyl phthalates (e. g., dimethyl phthalate, diethyl phthalate, etc.), may be employed. I prefer to use catalysts which are insoluble or substantially insoluble in water.

Good results have been obtained with benzoyl peroxide as the polymerization catalyst. Acyl peroxides having from two to eight carbon atoms, inclusive, in each of one or more aliphatic acyl groups, and the peroxides and hydroperoxides having alkyl groups containing from one to eight carbon atoms, inclusive, are classes of polymerization catalysts which may be used in practicing my invention.

The amount of polymerization catalyst may be varied as desired or as conditions may require, but ordinarily will be within the range of from about 0.05 to about 4% by weight of the monomeric material to be polymerized. In some cases it may be desirable to use as much as 5% or more of polymerization catalyst in order to shorten the polymerization time. If desired, a combination of ultraviolet light and a polymerization catalyst may be used in polymerizing the dispersed monomeric material; or, if the length of the polymerization period is of secondary importance, polymerization may be effected by ultraviolet light alone or by a combination of heat and ultraviolet light. I prefer to use heat and a polymerization catalyst in effecting polymerization of the dispersed monomeric material.

For optimum results and to keep losses to a minimum, the chosen plasticizer should be insoluble or substantially insoluble in water but soluble in the monomeric material. Plasticizers which are partly soluble in water may be used, but their use increases the cost of the process since some of the plasticizer than is lost in the aqueous dispersion medium. Moreover, in use, water-soluble plasticizers leach out and are lost. The amount of plasticizer may be varied considerably, but ordinarily is employed in an amount corresponding to, by weight, from about 5 to about 100 parts thereof for each 100 parts of the monomeric material.

The solution of the liquid monomeric material, e. g., a monomeric mixture of acrylonitrile and an alkyl acrylate, having dissolved therein a polymerization catalyst, more particularly an organic peroxide polymerization catalyst, and a plasticizer for the polymerization product, is subjected to polymerization conditions while the solution is dispersed, and maintained in a dispersed state, e. g., by stirring, in a liquid dispersion medium comprising a small amount of a dispersion agent, numerous examples of which have been given hereinbefore. Preferably the monomeric material is polymerized under heat, e. g., at a temperature within the range of about 50° C. up to and including the boiling point of the monomeric material. During this polymerization the solution is maintained in the form of globules in the aqueous dispersion medium.

Various granulating agents may be present in the dispersion medium during polymerization, for instance a water-soluble polymeric salt (e. g., a polymeric alkali-metal salt) of an unsaturated alpha,beta-polycarboxylic acid, and more particularly polymeric disodium or dipotassium maleate, fumarate or itaconate. The granulating agent aids in the formation of the spherical granules or beads and in maintaining the dispersed solution, which is the discontinuous phase, in the form of liquid globules of the desired size in the aqueous dispersion medium, which is the continuous phase, until the polymerization has proceeded to the desired degree and solid beads or spherical granules have been obtained. The amount of granulating agent may be considerably varied but, when employed, it is usually used in an amount corresponding to from about 0.1 to about 3% by weight of the monomeric material.

In all cases polymerization is continued, for instance by heating the mass at atmospheric pressure under reflux or at a temperature approaching that at which the mass will reflux under the application of sufficient heat, until a polymerization product is obtained which is not sticky at room temperature. The solid beads or granules which separate from the dispersion medium when stirring is stopped are readily removed from the reaction vessel, and may be separated from the dispersion medium by filtration, centrifuging, etc., washed (e. g., with water) to remove the dispersion agent or other contaminants and then dried, for example at room temperature or at an elevated temperature up to the softening point or the point at which the individual beads tend to stick together.

In order that those skilled in the art better may understand how the present invention may be carried into effect, the following examples are given by way of illustration and not by way of limitation. All parts and percentages are by weight.

*Example 1*

| | Parts |
|---|---|
| Water | 1000.0 |
| Bentonite | 1.25 |
| Acrylonitrile | 100.0 |
| Ethyl acrylate | 100.0 |
| o-Cresyl glyceryl ether | 50.0 |
| Benzoyl peroxide | 1.0 |

The bentonite is added to the water and the resulting dispersion is heated to 60°–70° C. The o-cresyl glyceryl ether and benzoyl peroxide are dissolved in the mixture of acrylonitrile and ethyl acrylate, and the solution thereby obtained is added to the dispersion of bentonite in water while agitating the latter. The mixture is heated with stirring (anchor stirrer, 200 R. P. M.) in a reaction vessel provided with a reflux condenser over a period of 25 minutes to 76° C., at which temperature refluxing begins. Heating is continued at about 75°–76° C. for approximately 3 hours while gently stirring the mass. Refluxing stops about 40 minutes before the end of the reflux period. Beads of plasticized copolymer of ethyl acrylate and acrylonitrile are formed in the aqueous dispersion medium. After allowing the mass to stand undisturbed for about 16 hours the beads of plasticized copolymer are filtered off, washed with water and then dried in a 90° C. oven. When the dried beads are heated to 130° C., they soften readily under moderate pressure. They may be used alone or in combination with other thermoplastic or thermosetting materials as molding (moldable) compositions or as components of such compositions. For example, they may be employed in conjunction with a heat-curable melamine-formaldehyde resin as more fully described and claimed in the aforementioned copending application of Henry P. Wohnsiedler and Edward L. Kropa, Serial No. 780,296.

*Example 2*

Same as in Example 1 with the exception that 1.25 parts of montmorillonite is used instead of 1.25 parts of bentonite.

Example 3

| | Parts |
|---|---|
| Water | 2000.0 |
| Bentonite | 2.5 |
| Acrylonitrile | 200.0 |
| Ethyl acrylate | 200.0 |
| o-Cresyl glyceryl ether | 100.0 |
| Benzoyl peroxide | 0.8 |

Essentially the same procedure is followed as described under Example 1 with the exception that the mixture is stirred with an anchor stirrer at 250 R. P. M. and the total heating period is about 8 hours. The mass is still refluxing when heating is discontinued. After standing undisturbed for about 16 hours, the beads of plasticized copolymer are isolated by filtering part of the aqueous dispersion medium containing the same and screening the remainder through a 60-mesh sieve. The separated beads are washed with water and then dried at 50°–60° C. The dried beads are clear, free flowing, show little tendency to agglomerate and have an average diameter such as is desirable in a molding powder. Substantially all of the beads each contain both the copolymeric material and the o-cresyl glyceryl ether plasticizer incorporated therein.

Analysis of the product indicates:

| | Per cent |
|---|---|
| Acrylonitrile component of copolymer (calculated from a nitrogen determination) | 35.2 |
| o-Cresyl glyceryl ether (calculated from a hydroxyl determination) | 20.8 |
| Ethyl acrylate component of copolymer (by difference) | 44.0 |

The product is more homogeneous than that obtained by mechanical blending of the separately prepared copolymer with o-cresyl glyceryl ether. At a given temperature and pressure in the range of 100°–150° C. and 200 to 1500 pounds per square inch pressure, about 15 times as much flow is obtained with the above plasticized copolymer as is obtained with a similar copolymer from which the o-cresyl glyceryl ether has been omitted. The plasticized copolymer blends well with a heat-curable melamine-formaldehyde resin on hot rolls.

Example 4

Same as Example 3 with the exception that 2.5 parts of leverrierite is used instead of 2.5 parts of bentonite.

Example 5

A

| | Parts |
|---|---|
| Acrylonitrile | 292.0 |
| Ethyl acrylate | 158.0 |
| o-Cresyl glyceryl ether | 50.0 |
| Benzoyl peroxide | 0.9 |
| Water | 1000.0 |

The first four ingredients are mixed together and the resulting solution then is shaken with one-half (500 parts) of the water. The pH of the aqueous layer is 4.5. After adding 1 part of normal NaOH solution and again shaking, the pH of the aqueous layer is 8.8. One part of sodium bicarbonate and the remaining 500 parts of water are now added. The mixture is shaken again, the pH of the aqueous layer being 8.5.

B

| | Parts |
|---|---|
| Water | 1000.0 |
| Bentonite | 2.5 |

The bentonite is dispersed in the water after which the above-described product of A is added thereto. The mixture of A and B is heated with stirring (anchor stirrer, 250 R. P. M.) under reflux for about 2½ hours. Heating is then discontinued but stirring is continued for about 16 hours. The plasticized copolymer is obtained in the form of very small beads, which are separated from the aqueous dispersion by filtering and screening. The separated beads are washed with water and then dried at 65° C.

Example 6

Same as Example 3 with the exception that 200 parts of methyl acrylate is used in place of 200 parts of ethyl acrylate.

Example 7

Same as Example 3 with the exception that 2.5 parts of polymerized disodium fumarate is added to the water in addition to the 2.5 parts of bentonite.

The spherical granules or beads produced in accordance with my invention may be molded directly or they may be formed into sheets and the sheet materials used for various purposes. Surface coating compositions may be produced by dissolving the beads in suitable solvents and blending the resulting solution with solutions of urea-formaldehyde resins, melamine-formaldehyde resins, alkyd resins, etc. They are especially suitable for use as modifiers of heat-curable melamine-formaldehyde resins in the production of hot-moldable compositions, as more fully described and claimed in the copending application of Henry P. Wohnsiedler and Edward L. Kropa, Serial No. 780,296, filed concurrently herewith.

I claim:

1. Beads of a copolymer of ethyl acrylate and acrylonitrile plasticized with o-cresyl glyceryl ether, said beads being the product of the method of claim 2.

2. The method of producing beads of a copolymer of ethyl acrylate and acrylonitrile plasticized with o-cresyl glyceryl ether, said method comprising forming a dispersion of a small amount of an inorganic colloidal dispersing agent in water; dissolving o-cresyl glyceryl ether and benzoyl peroxide in a mixture of acrylonitrile and ethyl acrylate in a weight ratio of from about 35 to about 65 parts of acrylonitrile to from about 65 to about 35 parts of ethyl acrylate, the o-cresyl glyceryl ether being employed in an amount corresponding to, by weight, from about 5 to about 100 parts thereof for each 100 parts of the said mixture of acrylonitrile and ethyl acrylate and the benzoyl peroxide being employed in an amount corresponding to from about 0.05% to about 4% by weight of the said mixture of acrylonitrile and ethyl acrylate; adding the resulting solution to the said dispersion of inorganic colloidal dispersing agent in water while agitating the latter; heating the resulting mixture under reflux while gently stirring the mass until refluxing stops and for a short period thereafter whereby an acrylonitrile-ethyl acrylate copolymer plasticized with o-cresyl glyceryl ether is obtained in the form of beads; separating the said beads from the aqueous dispersion medium in which they were formed; and washing and drying the separated beads.

3. A method as in claim 2 wherein the inorganic colloidal dispersing agent comprises montmorillonite.

4. The method of producing beads of a copolymer of ethyl acrylate and acrylonitrile plasticized with o-cresyl glyceryl ether, said method comprising dispersing 1.25 parts by weight of an inorganic colloidal dispersing agent comprising montmorillonite in 1000 parts of water; dissolving 50 parts by weight of o-cresyl glyceryl ether and 1 part by weight of benzoyl peroxide in a mixture of, by weight, 100 parts of acrylonitrile and 100 parts of ethyl acrylate; adding the resulting solution to the dispersion of the inorganic colloidal dispersing agent comprising montmorillonite in water while agitating the latter; heating the resulting mixture under reflux at a temperature of the order of 75°–76° C. while gently stirring the mass until refluxing stops and for a short period thereafter whereby an acrylonitrile-ethyl acrylate copolymer plasticized with o-cresyl glyceryl ether is obtained in the form of beads; filtering the said beads from the aqueous dispersion medium in which they were formed; washing the separated beads with water; and drying the washed beads.

5. The method of producing beads of a copolymer of ethyl acrylate and acrylonitrile plasticized with o-cresyl glyceryl ether, said method comprising adding 1.25 parts by weight of bentonote to 1000 parts by weight of water and dispersing the former in the latter; heating the resulting dispersion to 60°–70° C.; adding to the heated dispersion, while agitating the same, a solution of, by weight, 50 parts of o-cresyl glyceryl ether and 1 part of benzoyl peroxide dissolved in a mixture of 100 parts each of acrylonitrile and ethyl acrylate; heating the resulting mixture under reflux at a temperature of about 75°–76° C. for approximately 3 hours after initial refluxing while gently stirring the mass whereby an acrylonitrile-ethyl acrylate copolymer plasticized with o-cresyl glyceryl ether is obtained in the form of beads; allowing the mass to remain undisturbed for about 16 hours; filtering the mass of beads from the aqueous dispersion medium in which the beads were formed; washing the separated beads with water; and drying the washed beads at 90° C.

6. The method of producing beads of a copolymer of ethyl acrylate and acrylonitrile plasticized with o-cresyl glyceryl ether, said method comprising adding 1.25 parts by weight of montmorillonite to 1000 parts by weight of water and dispersing the former in the latter; heating the resulting dispersion to 60°–70° C.; adding to the heated dispersion, while agitating the same, a solution of, by weight, 50 parts of o-cresyl glyceryl ether and 1 part of benzoyl peroxide dissolved in a mixture of 100 parts each of acrylonitrile and ethyl acrylate; heating the resulting mixture under reflux at a temperature of about 75°–76° C. for approximately 3 hours after initial refluxing while gently stirring the mass whereby an acrylonitrile-ethyl acrylate copolymer plasticized with o-cresyl glyceryl ether is obtained in the form of beads; allowing the mass to remain undisturbed for about 16 hours; filtering the mass of beads from the aqueous dispersion medium in which the beads were formed; washing the separated beads with water; and drying the washed beads at 90° C.

WALTER M. THOMAS.

REFERENCES CITED

The following references are of record in the file of this patent:

UNITED STATES PATENTS

| Number | Name | Date |
|---|---|---|
| 2,166,518 | Caplan | July 18, 1939 |
| 2,191,520 | Crawford et al. | Feb. 27, 1940 |
| 2,217,119 | Kerr | Oct. 8, 1940 |
| 2,350,032 | Hager | May 30, 1944 |
| 2,440,808 | Neher et al. | May 4, 1948 |

OTHER REFERENCES

Monomers, Blout et al., published by Interscience Publishers, Inc., New York, 1949 (page 18).

Certificate of Correction

Patent No. 2,558,396                                                      June 26, 1951

WALTER M. THOMAS

It is hereby certified that error appears in the printed specification of the above numbered patent requiring correction as follows:

Column 2, line 14, for "requried" read *required*; column 3, line 50, for "free" read *from*; column 7, line 36, for "than" read *then*; column 11, line 24, for "bentonote" read *bentonite*;

and that the said Letters Patent should be read as corrected above, so that the same may conform to the record of the case in the Patent Office.

Signed and sealed this 23rd day of October, A. D. 1951.

[SEAL]

THOMAS F. MURPHY,
                                                                      *Assistant Commissioner of Patents.*